United States Patent [19]

Arnaud

[11] Patent Number: 4,517,089
[45] Date of Patent: May 14, 1985

[54] METHOD AND APPARATUS FOR CONSTRUCTING FILTER ELEMENT

[75] Inventor: Johnny Arnaud, Houston, Tex.

[73] Assignee: Hydrotreat, Inc., Houston, Tex.

[21] Appl. No.: 491,711

[22] Filed: May 5, 1983

Related U.S. Application Data

[63] Continuation-in-part of Ser. No. 428,345, Sep. 29, 1982.

[51] Int. Cl.³ .............................................. B01D 39/10
[52] U.S. Cl. ..................................... 210/488; 210/495; 210/498
[58] Field of Search .......................... 210/488, 495, 498

[56] References Cited

U.S. PATENT DOCUMENTS

| | | | |
|---|---|---|---|
| 3,827,568 | 8/1974 | Toth | 210/488 |
| 4,133,379 | 1/1979 | Nuzman et al. | 210/497.1 |
| 4,267,045 | 5/1981 | Hoof | 210/488 |
| 4,272,257 | 6/1981 | Ellion | 210/488 |
| 4,410,430 | 10/1983 | Hagler, Jr. | 210/488 X |

*Primary Examiner*—John Adee
*Attorney, Agent, or Firm*—Arnold, White & Durkee

[57] ABSTRACT

A filter mesh constructed from a plurality of structural members. Each member has a central body portion and a plurality of extensions extending therefrom such that when such sections are assembled together the extensions hold the body members in spaced relation and define a plurality of orifices in the structure. The extensions preferrably extend to one side of the body members and are preferrably shaped such that a contoured surface is effectively formed to one side of the body members, such contoured surface simulating the surface of a woven mesh. A variety of mesh patterns may be duplicated by the appropriate alterations in the placement and conformity of the extensions relative to the body portions of the structural members.

10 Claims, 9 Drawing Figures

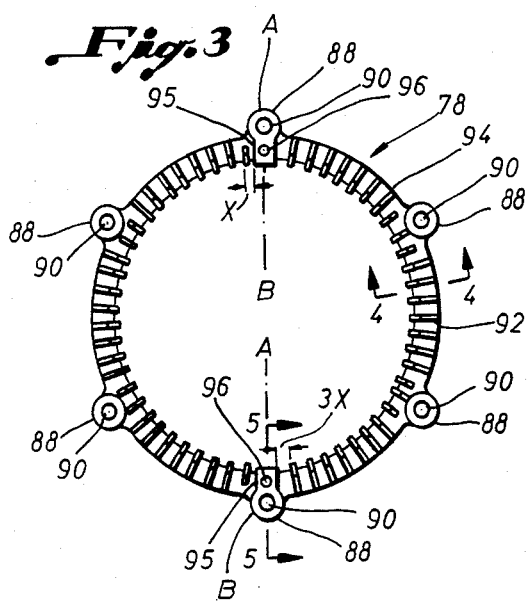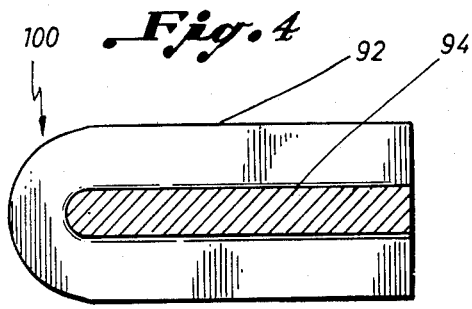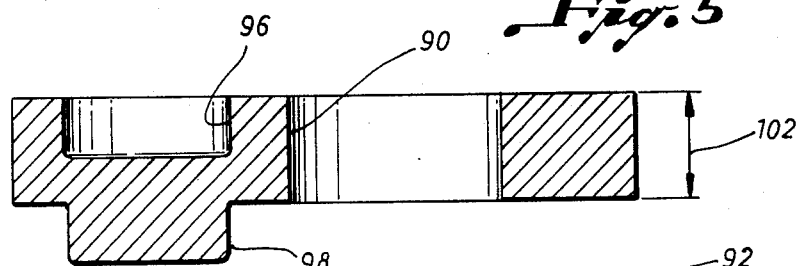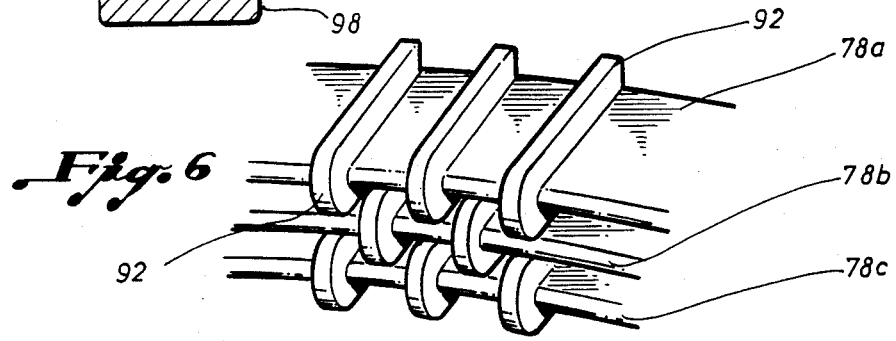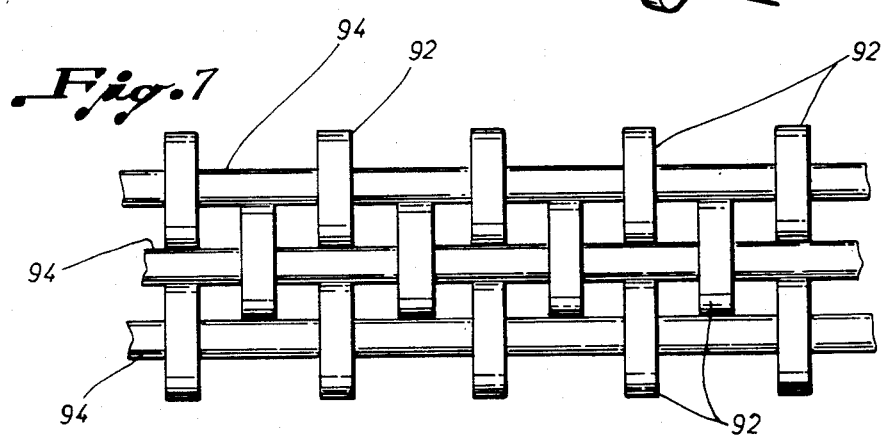

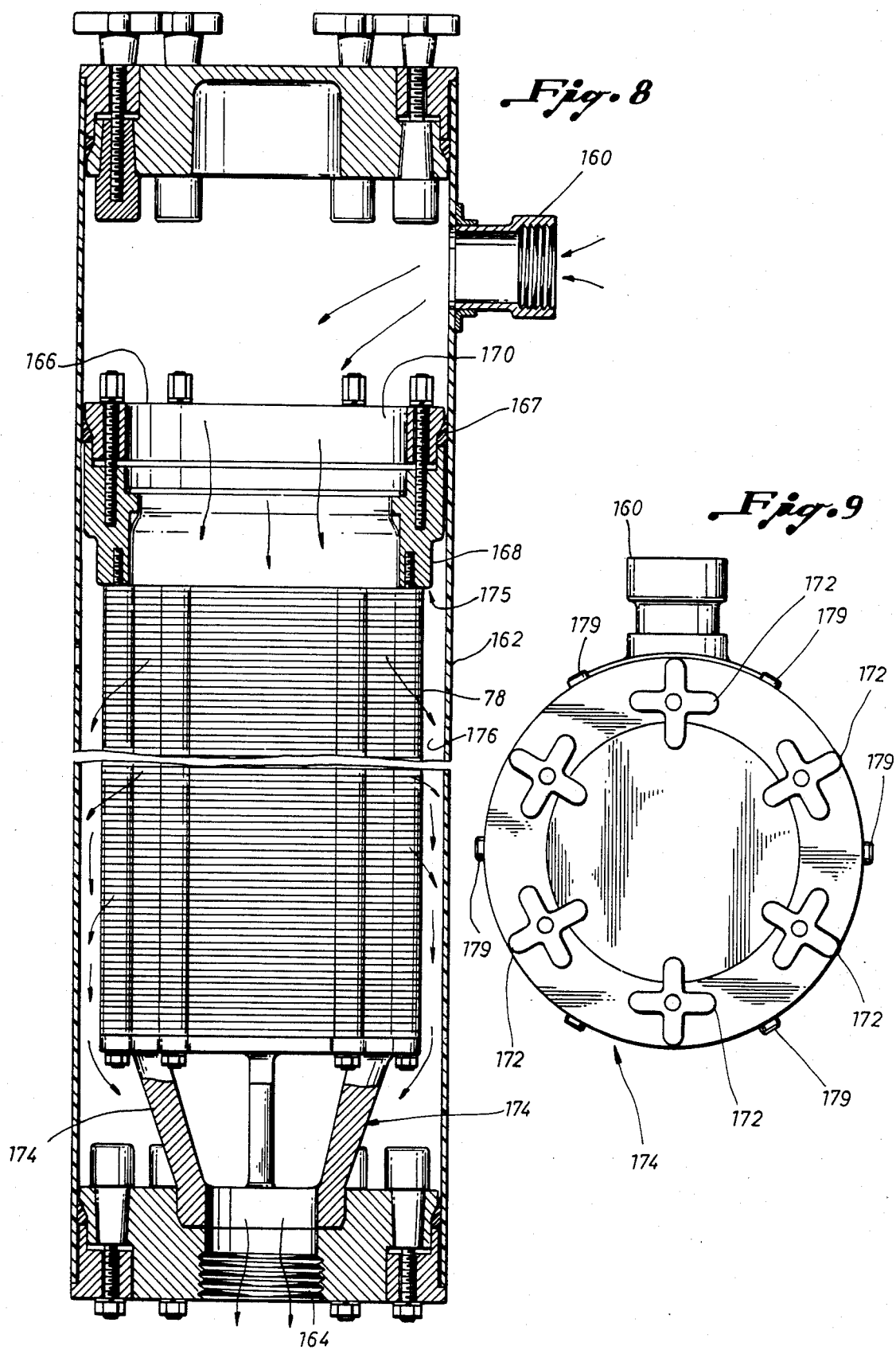

METHOD AND APPARATUS FOR CONSTRUCTING FILTER ELEMENT

This application is a Continuation-In-Part of my co-pending U.S. application, Ser. No. 428,345, filed Sept. 29, 1982.

BACKGROUND OF THE INVENTION

The present invention relates generally to methods and apparatus for constructing filter elements, and more specifically relates to methods and apparatus for constructing porous filter meshes from a plurality of similarly-shaped components.

Many filter apparatus, particularly of those designed for use in industrial applications, include a conduit or housing and a rigid or semi-rigid filter element contained therein. As an example, many of these filter elements are of a generally cylindrical form and have an inlet end into which the fluid flows. Filtering occurs when the fluid flow passes through the radial surfaces of the filter element. It will be appreciated that the restriction of the filter element creates a pressure differential across the filter element which the element must withstand. It will further be appreciated that this pressure differential may take on significant proportions, particularly in high flow rate or high fluid pressure environments.

Many filter elements include a structural filter mesh, either for directly accumulating particulate matter contained within the fluid, or for supporting a porous filter material, such as a cloth bag. This bag may be formed of various types of cloth, for example, polyethylene fibers are often used, and typically is formed of a specific weave design and filter capability. Additional specific difficulties are encountered when the structural filter mesh is used to support such a cloth filter material. Because of the differential pressure acting upon the cloth, the cloth will tend to distort, moving into the orifices of the filter mesh and clogging the mesh, thereby impeding or precluding the effective operation of the filter apparatus. Again, these difficulties take on significant proportions in high flow rate or high fluid pressure environments.

Many weaves of filter meshes have been developed which minimize these clogging techniques under specific conditions, when used in conjunction with a flexible cloth filter. These meshes are typically woven of wire and are formed into desired forms by cutting and welding as needed. These woven filter meshes present difficulties in that, unless the mesh is supported by additional mechanisms, they typically do not have significant structural rigidity necessary for use in many applications. Further, the materials which are necessary to construct a mesh of a given size or porosity may not be the materials which are suitable for forming a mesh of the required structural characteristics.

Accordingly, the present invention provides a method and apparatus whereby a filter mesh may be constructed from a plurality of similar components, such components shaped to construct a filter mesh of the desired form, such components adaptable to constructing a generally rigid filter mesh over a wide range of mesh designs and grades.

SUMMARY OF THE INVENTION

A plurality of components, preferably of an identical form, are adapted to be assembled such that at least one surface of the assembled structure bears surface characteristics similar to those exhibited by a woven mesh. For example, in a specific preferred embodiment, a plurality of mesh rings are assembled to construct the structural filter mesh. In this particular preferred embodiment, each ring has a generally contiguous portion and has a plurality of radially situated ribs spaced at selected intervals around the circumference of the contiguous portion. Each rib forms a generally continous abutment extending to the as well as the upper and lower surfaces of the continguous portion. The inner extending portion of the rib is perferrably rounded so as to present a generally bowed profile to the inner area of the mesh ring. A plurality of these mesh rings are stacked one on top of the other in a particular orientation and secured in place by a plurality of rods or other mechanisms. Thus, the inner surface of the mesh structure exhibits a great plurality of these bowed inner extensions of the ribs, such inner extensions established in a particular pattern according to the construction of each mesh ring and providing a filter mesh of desired structural and surface contour characteristics.

BRIEF DESCRIPTION OF THE DRAWINGS

FIG. 3 is a top view of a single mesh ring of the filter element of FIG. 2.

FIG. 4 is a cross-sectional view of a single mesh ring, taken along lines 4—4 in FIG. 3.

FIG. 5 is a cross-sectional view of a mesh ring index tab, taken along line 5—5 in FIG. 3.

FIG. 6 is an internal view of an intended assembly of three mesh rings.

FIG. 7 is an extension drawing depicting the effective mesh of the assembled rings of FIG. 6.

FIG. 8 is a cross-sectional view of an alternative embodiment of a filter apparatus in accordance with the present invention.

FIG. 9 is a top view of the filter apparatus of FIG. 8.

DETAILED DESCRIPTION OF A PREFERRED EMBODIMENT

Figure 1:
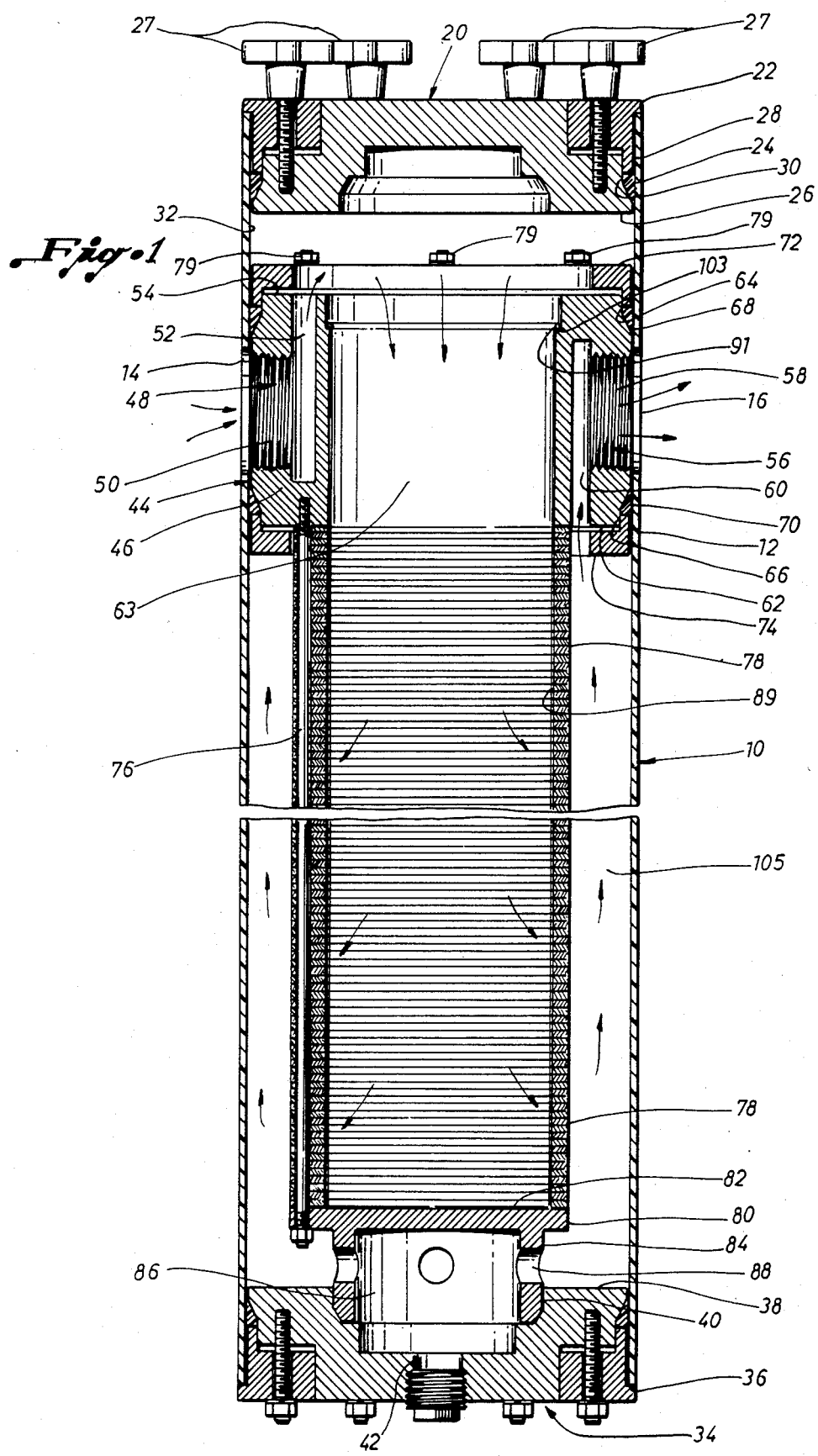
FIG. 1 is a sectional view of a filter apparatus constructed in accordance with the present invention.

Referring now to the drawings in more detail, and particularly to FIG. 1, therein is illustrated a filter apparatus 10 in accordance with the present invention. Filter apparatus 10 includes a housing 12 which is preferably of a generally cylindrical form and may be constructed of any relatively rigid material adapted to withstand the pressures and conditions of the intended environment. Housing 12 includes an inlet port 14 and an outlet port 16 through which fluid may enter and exit, respectively, filter apparatus 10. Housing 12 is sealed at a first end 18 by an end cap 20 having a wedge-shaped annular seal of the type described in my co-pending application, Ser. No. 428,345 entitled "Weld-Free All Purpose Seal For Closed Fluid Systems", the specification of which is incorporated herein by reference. Briefly, first end seal 20 includes a ring body 22, a flexible annular seal 24, and a wedge block 26. Wedge block 26 is secured in position relative to housing 12 by a plurality of pins (not illustrated) extending therebetween. A plurality of bolts 27 extend through ring block 24 into wedge block 26 to facilitate the drawing of the two parts into increasingly proximal relation to one another. A downwardly-extending flange 28 along the radial periphery of ring body 22 fits within a groove 30 around the peripheral surface of wedge block 26, in which annular seal 24 is placed. The lower surfaces of both groove 30 and annular seal 24 have complimentary, cooperatively engagable tapered surfaces such that as bolts 27 are rotated, drawing ring body 22 and wedge block 26 towards one another, the tapered surfaces in groove 30 and on annular seal 24 cause annular seal 24 to be forced radially outward, thereby sealably engaging with internal surface 32 of housing 12.

Second end seal 34 is affixed to second end 36 of housing 12 in a manner similar to that discussed above with respect to first end seal 20. As will be discussed more fully later herein, second end seal wedge block 38 preferably has a recess 40 formed therein. Also, as will be discussed later herein, it is often desirable that recess 40 be coupled by means of a sealable aperture 42 to the exterior of filter apparatus 10.

Figure 2:
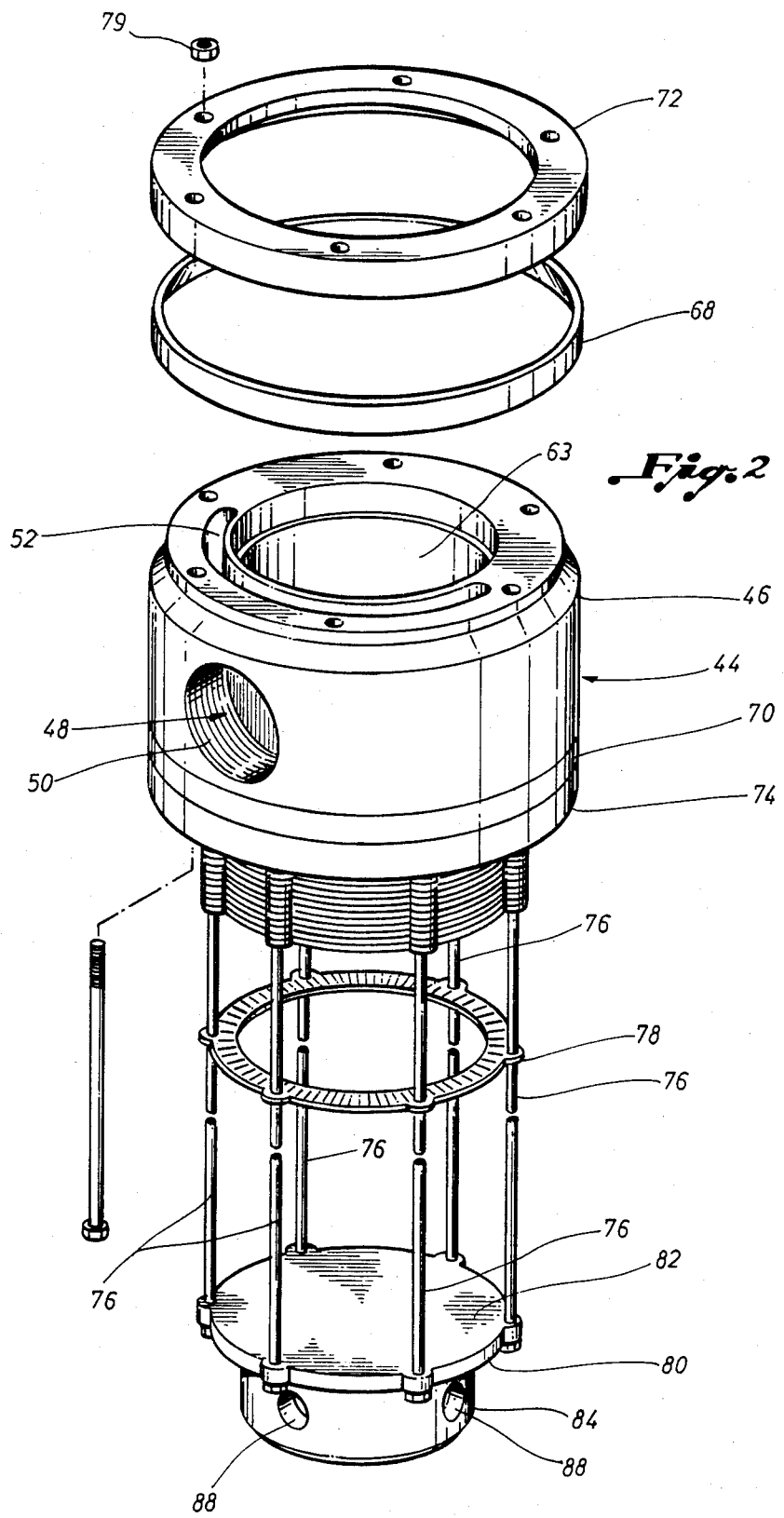
FIG. 2 is a perspective view showing the assembly of the filter element of the filter apparatus of FIG. 1.

Referring now to FIGS. 1 and 2, therein in FIG. 2 is shown filter element 44 in perspective view, showing block 46 contains inlet passage 48 composed of an inlet aperture 50, which may preferably contain threads or other suitable means for coupling a conduit to mounting block 46, and an aperture 52 extending to upper surface 54 of mounting block 46. Aperture 52 preferably extends along a radius for a less-than-semicircular dimension around mounting block 46. Similarly, mounting block 46 contains an exit passage 56 composed of an exit aperture 58, which also may contain threads or other means for coupling to a conduit, and an aperture 60 extending to lower surface 62 of mounting block 46. Aperture 60 preferably also extends along a radius for a less-than-semicircular direction around mounting block 46. This partially circular form of apertures 52 and 60 maintains the flow area into and out of filter apparatus 10. By forming apertures 52 and 60 of less than semi-circular form, they may be placed along the same radius of mounting block 46. Mounting block 46 also contains upper and lower vertical peripheral grooves, 64 and 66, respectively. The central portions of grooves 64 and 66 have tapered surfaces comparable both to that in groove 30 in upper wedge block 26 and to that found on lower wedge 38. Disposed within each groove 64 and 66 is a flexible annular seal 68 and 70, appropriately oriented to cooperate with the tapered surfaces of grooves 64 and 66. Boltably secured to mounting block 46 are upper and lower ring bodies 72 and 74, respectively. It will be appreciated that no pins are required to hold mounting block 46 in position because, unlike end seals 20 and 34, mounting block 46 is supported by fluid pressure on both lateral sides. Any bias in fluid pressure will be on the inlet side of mounting block 46, biasing filter element 44 to an increasingly secure position.

Threadably secured to mounting block 46 and extending from lower surface 62 thereof, are a plurality of rods 76 spaced at preferably equal intervals around a given radius of mounting block 46. Stacked and assembled on rods 76 are a plurality of mesh rings 78 which will be described more fully in relation to FIGS. 3 thru 7. Coupled to rods 76, at the lower end of stacked mesh rings 78, is bottom cap 80 which preferably will present a solid upper surface 82 to the stack of mesh rings 78 and will have a downwardly extending block 84 which is preferably of a cylindrical form. As will be discussed more fully later herein, it is often desirable that block 84 have a central, downwardly opening recess 86 and a plurality of apertures 88 extending from recess 86 to the exterior of block 84.

In an intended application of filter element 44, a porous filter element such as a filter bag 89 is disposed within the assembled stack of mesh rings 78 in a manner known to the art. Bag 89 may be retained in place by a wire ring 101 affixed to, or integral with, bag 89, ring 101 resting on a shoulder 103 in aperture 63 within mounting block 46.

Referring now to FIG. 3, therein is illustrated a single mesh ring 78, depicted from a top view. Mesh ring 78 is of a generally circular shape and contains preferably externally extending abutments 88 to facilitate suitable enclosures around apertures 90 through which the rods (76 in FIGS. 1 and 2) will pass. A plurality of ribs 92 preferably extend above and below body 94 of mesh ring 78. In a preferred embodiment, ribs 92 are equidistantly spaced around semicircular portions of mesh ring 78, although, as will be apparent from the discussion to follow, in other embodiments it may be preferable for ribs 92 to be placed at other spacings on body 94. Viewing mesh ring 78 along diameter line "A-B", it will be seen that a plate 95 containing an orienting recess 96 and tab (98 in FIG. 5) is found radially adjacent abutment A and abutment B. It will also be seen that, moving counterclockwise from abutment "A", first rib 92 is located a distance "X" from the adjacent edge of plate 95. Still moving counterclockwise, the remainder of ribs 92 are then, in this particular preferred embodiment, spaced a distance of 3× from the nearest edge of the previous adjacent rib 92. Starting now at abutment "B" and moving counterclockwise, it will be seen that the closest rib 92 is spaced a distance 3× from the nearest adjacent edge of plate 95. The remainder of ribs 92 in this second half of mesh ring 78 are then similarly spaced 3× from the adjacent edge of the next preceding rib 92.

It will be seen that each rib 92 preferably represents a generally rectangular form when viewed from a position above or below mesh ring 78 and proximate the axis thereof. It is to be understood that other forms of ribs 92 may effectively be utilized without departing from the scope of the invention. For example, ribs 92 could be formed so as to present a generally trapezoidal form to a view from above or below as described above, the broader of the two parallel surfaces of the trapezoidal rib oriented to the exterior of mesh ring 78 so as to define a rectangular path between adjacent ribs 92 or, also, for example, the trapezoidal ribs might be oriented with the longer side oriented to the interior of mesh ring 78 to facilitate a filter flow path form such as that commonly referred to in the trade as "wedge wire" associated with filter materials.

Referring now to FIG. 4, therein is illustrated a cross-sectional view of mesh ring 78 along line 4—4 in FIG. 3, showing the profile of a preferred form of rib 92. In this particularly preferred embodiment, inner end 100 of rib 92 has a radius so as to present a bowed or rounded shoulder to the inside of mesh ring 78. It will be noted that rib 92 preferably extends equidistantly above and below body of mesh ring 78.

Referring now to FIG. 5, therein is illustrated a cross-sectional view of mesh ring 78 along line 5—5 in FIG. 3, depicting plate B. Directly beneath orienting recess 96 is orienting tab 98. The height 102 of plate B is preferably generally that of each rib 92.

Referring now to FIGS. 4 and 6, therein is shown in FIG. 6 a portion of a stacked assembly of three mesh rings 78 in an intended assembled configuration. For clarity, only a few ribs 92 on each ring 78 have been shown. It will be noted that the ribs 92 of center mesh ring 78B are interposed between the vertically aligned ribs 92 of upper and lower mesh rings 78A and 78C. This interposition or offset is achieved in the mesh ring assembly by orienting vertically adjacent rings 180° out of phase with one another, i.e., orienting plate A above plate B over plate A of the tiered rings. The above-described asymmetrical spacing of the ribs between the two halves of mesh ring 78 establish the rib offset.

FIG. 7 is an extension view of a filter constructed in accordance with the present invention as shown in FIG. 6, With the fore-shortening of ribs 92 removed, it is possible to see the effective mesh presented to fluid flow within the filter element.

It will be apparent to those skilled in the art that many materials may be used for the construction of mesh rings 78. It is envisional that for most applications, moldable materials such as plastics, in some instances fiber-filled, will be a suitable and optimally cost effective material for mesh rings 78.

It will be appreciated that many alterations in the form of mesh rings 78 as illustrated in this particular prefersed embodiment may be made without departing from the scope of the present invention. It will further be appreciated that while the mesh pattern illustrated is a particularly preferred embodiment, other patterns of meshes known to those skilled in the art may be mechanically constructed by appropriate alterations in the construction of mesh rings 78, and particularly in the form or dimensions of ribs 92 and their arrangement on body 94 of mesh ring 78.

Referring again to FIG. 1, when filter element 46 is fully assembled, the stack of mesh rings 78, along with bottom plate 80, are secured by nuts to rod 76 such that a generally rigid unit is formed. With first end cap 70 removed, filter element 44 may be slidably inserted into housing 12. Block 84 of bottom cap 80 enters recess 40 in lower wedge block 38 and filter element 44 may be inserted into housing 12 until block 84 is firmly seated within recess 40. Filter element 44 may then be rotated within housing 12 until inlet aperture 48 is aligned with aperture 14 and exit aperture 58 is aligned with aperture 16. When filter element 44 is properly located, bolts 79 extending through upper and lower mounting rings 74 and 76, respectively, and mounting block 46 are tightened so as to draw upper and lower mounting rings 74 and 76 centrally toward mounting block 46, thereby urging flexible sealing rings 68 and 70 into sealing engagement with inner surface 36 of housing 12. It will be appreciated that the position of filter element 44 within housing 12 is limited only by registry of mounting block apertures 48 and 58 with apertures 14 and 16 in housing 12. By forming apertures 14 and 16 in housing 12 of longitudinally-oriented oval forms, an extended range of adjustment may be facilitated.

In the operation of filter apparatus 10, as will be appreciated from the arrows indicating flow, the fluid flow will enter inlet passage 48 and flow to the top of mounting block 46 and then down through aperture 63 to a location adjacent the stack of mesh rings 78, whereat the fluid may flow through filter bag 89 and mesh rings 78 into annulus 105 surrounding filter element 46. The fluid may then enter aperture 60 and exist filter apparatus 10 through outlet aperture 56.

In many applications, it is desirable to have provisions for cleansing, or "blowing down" of the filter apparatus. In the depicted embodiment this is facilitated by the removal of plug 107 in aperture 42, thereby permitting fluid to pass through apertures 88 and recess 86 in block 84 to exit filter apparatus 10 thereby, carrying any accumulated sludge or particulate matter from filter apparatus 10.

Referring now to FIG. 8, therein is shown an alternative embodiment of a filter apparatus 150 in accordance with the present invention. The essential functions of the components are similar to those described in response to the discussion of the previous embodiment and only the pertinent differences will be discussed here. It will be seen that an inlet fitting 160 is affixed to the exterior of housing 162. Similarly, an exit aperture 164 is located within second end wedge block 166. Accordingly, mounting block 168 does not require the inlet and outlet aperture provisions of the prior embodiment and has only a central longitudinal aperture 170. Further, because of the different inlet and outlet structure, mounting block 166 does not require the two spaced annular seals of the previous embodiment. Therefore, mounting block 166 contains only one groove 167 and is cooperatively engaged with only one ring body 168. It will be seen that the stack of mesh rings 78 are coupled to ring body 168 rather than to mounting block 166. The annular seal around mounting block 166 is activated in a manner similar to that described earlier with regard to the first end cap (20 in FIG. 1) of the previous embodiment. Bottom plate 172 is preferably extended, relative to the previous embodiment, and contains extending struts 174 so as to provide minimal restrictions to fluid flow toward exit aperture 164. It will be appreciated that without the restriction of achieving registry with apertures in the housing, filter element 175 may be located at virtually any desired longitudinal location within housing 162. It will further be appreciated that this facilitates the adjustment of filter element length by adding or subtracting mesh rings 78 as may be desired. Thus, the filter element may be adjusted in response to various conditions or environments without changing the filter housing.

FIG. 9 is a top view of the filter apparatus of FIG. 8 showing the general form thereof and depicting securing bolts 172 by which upper end seal 174 is secured to housing 162. Also depicted are pins 175 extending between housing 162 and the wedge block of upper end seal 179.

The operation of this alternative embodiment is again similar to that described with regard to the previous embodiments. The fluid will enter filter apparatus 150 through inlet fitting 160, flow into aperture 170 in mounting block 166, through mesh rings 78 into annulus 176 and out of filter apparatus 150 through exit aperture 164.

Many modifications and variations may be made in the methods and apparatus described herein and depicted in the accompanying drawings without departing substantially from the concept of the present invention. Accordingly, the proceeding discussion is exemplary only and is not intended to limit the scope of the present invention.

The embodiments of the invention in which an exclusive property or privilege is claimed, are defined as follows:

1. A filter mesh, comprising a plurality of structural components, each structural component including a body portion and further including a plurality of extensions extending relative to one side of said body portion, said plurality of structural components adapted to cooperatively assemble and being cooperatively shaped to form a surface having a contour similar to the general contour of a woven mesh.

2. The filter mesh of claim 1, wherein said body portion is of a generally continuous form.

3. The filter mesh of claim 2, wherein said body portion is ring-shaped.

4. The filter mesh of claim 1, wherein said extensions are generally perpendicularly aligned relative to said body portion.

5. The filter mesh of claim 4, wherein at least some of said extensions have a radial surface extending from one side of said body portion.

6. A filter mesh, comprising a plurality of structural components, each structural component having a generally flat, continuous body portion and further having a plurality of ribs extending from at least one generally flat surface of said body portion, at least some of said ribs also extending radially to one side of said body portion, said plurality of sructural components cooperatively aligned to form a countoured radial surface of said filter, wherein said ribs cooperatively cause said surface to exhibit a contour similar to the contour of a woven mesh.

7. The filter mesh of claim 6, wherein said ribs are oriented generally radially relative to said continuous body portion.

8. The filter mesh of claim 7, wherein each of said ribs extension relative to each flat side of said ring-shaped body portion and also exhibits a curved surface to a radial side of said body portion.

9. A filter mesh, comprising:
a plurality of mesh rings retained in stacked axial alignment, said rings cooperating to form a structural mesh having a contour on one side which is similar to the contour of a woven mesh, each mesh ring comprising;
a generally flat ring-shaped body portion; and
a plurality of ribs extending relative to the upper, lower, and inward surfaces of said body portion, each rib presenting a bowed surface to the interior of said ring-shaped body portion, said ribs symmetrically spaced along arc segments of said ring-shaped body portions.

10. The filter mesh of claim 9, wherein said ribs are spaced along said arc segments such that adjacent rings may be oriented and retained with said ribs of axially adjacent rings placed in interdigitating relation to one another.

* * * * *

UNITED STATES PATENT AND TRADEMARK OFFICE
CERTIFICATE OF CORRECTION

PATENT NO. : 4,517,089

DATED : May 14, 1985

INVENTOR(S) : Johnny Arnaud

It is certified that error appears in the above-identified patent and that said Letters Patent is hereby corrected as shown below:

In column 2, line 62, after "a wedge block 26.", please delete "Wedge block 26" and in its place substitute --Ring body 22--.

In column 4, line 5, after "wire ring", please delete "101" and in its place substitute --91--.

In column 4, line 6, before "resting on", please delete "101" and in its place substitute --91--.

In column 5, line 22, please delete "prefersed", and in its place substitute --preferred--.

In column 6, line 27, after "Bottom plate", please delete "172".

In claim 6, line 7, please delete "sructural" and in its place substitute --structural--.

In FIG. 9, please delete reference numeral 174.

Signed and Sealed this

Fifteenth Day of October 1985

[SEAL]

Attest:

*Attesting Officer*

DONALD J. QUIGG

*Commissioner of Patents and Trademarks—Designate*